(No Model.)

M. M. NICHOLS.
FLEXIBLE TUBING.

No. 284,050. Patented Aug. 28, 1883.

WITNESSES:
Otto Hufeland
William Miller

INVENTOR
Mark M. Nichols
BY Van Santvoord & Hauff
ATTORNEYS

UNITED STATES PATENT OFFICE.

MARK M. NICHOLS, OF NEW YORK, N. Y.

FLEXIBLE TUBING.

SPECIFICATION forming part of Letters Patent No. 284,050, dated August 28, 1883.

Application filed April 12, 1883. (No model.)

*To all whom it may concern:*

Be it known that I, MARK M. NICHOLS, a citizen of the United States, residing at New York, in the county and State of New York, have invented new and useful Improvements in Flexible Tubing and in the Manufacture thereof, of which the following is a specification.

This invention relates to that class of flexible tubing in which one of the elements is india-rubber. Prior to my invention this rubber has been vulcanized at the proper place on the tubing; but by the heat to which the article is thus exposed the parts supporting the rubber are liable to be injured, and to overcome the objection thus created I use a rubber pipe previously vulcanized, as hereinafter more fully set forth, and as illustrated in the accompanying drawings, in which—

Figure 1:
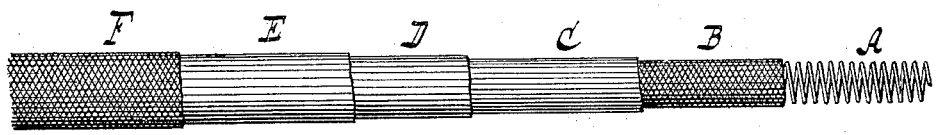
Figure 2:
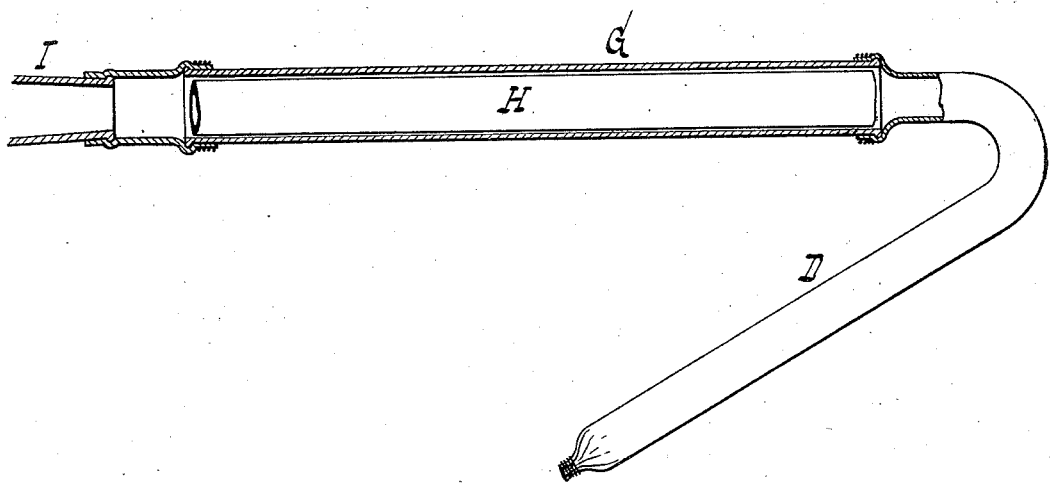

Figure 1 shows a piece of tubing in side view containing my invention, portions of the layers or courses of material of which it is composed being broken away to exhibit the whole series. Fig. 2 illustrates the manner of combining the rubber pipe with the tubing.

Similar letters indicate corresponding parts.

The letter A designates the usual wire coil forming the foundation of a flexible tubing; B, a braid of tubular form next to and covering said coil; C, a composition layer of glue and glycerine next to the braid; D, a pipe of vulcanized india-rubber next to said composition layer; E, a second composition layer of glue and glycerine next to the rubber pipe, and F a second or outer braid next to the second composition layer.

The advantage peculiar to the tubing obtained by the combination of parts above enumerated is that the india-rubber is protected against the destructive action of both the gas passing through the tube and the atmosphere, due to its being covered on both sides by the said composition layers.

The method of combining the india-rubber pipe with the tubing is as follows: One end of the rubber pipe is closed air-tight, as by tying it with a string, and the other end thereof is connected to a metallic pipe, G, Fig. 2, by an air-tight joint. The support for the rubber pipe—consisting, in this example, of the wire coil A, braid B, and inner composition layer, C—is then introduced into the metallic pipe, as indicated at H, and a blast of air is injected into said pipe at its free end, as by a nozzle, I, connecting with an air-pump, whereby the rubber pipe is expanded sufficiently to admit the support. Said support is then allowed to slide into the rubber pipe by holding the parts in the proper position, and the rubber pipe being then disconnected from the metallic pipe, it is ready to receive the remaining layers or courses to complete the tubing.

What I claim as new, and desire to secure by Letters Patent, is—

1. A flexible tubing in which are combined a pipe of vulcanized india-rubber and a composition layer of glue and glycerine on both sides of said pipe, with an inner and outer layer of braid and wire-coil foundation, substantially as and for the purpose described.

2. The within-described method of combining a pipe of vulcanized india-rubber with a flexible tubing, which consists in closing one end of the rubber pipe and connecting its other end to a metallic pipe, then introducing the support for the rubber pipe into the metallic pipe and injecting into the latter a blast of air for expanding the rubber pipe, and finally causing said support to slide into the expanded pipe.

In testimony whereof I have hereunto set my hand and seal in the presence of two subscribing witnesses.

MARK M. NICHOLS. [L. S.]

Witnesses:
W. HAUFF,
CHAS. WAHLERS.